United States Patent
Huebner et al.

(10) Patent No.: US 8,705,744 B2
(45) Date of Patent: Apr. 22, 2014

(54) WIRELESS SENSOR NETWORK KEY DISTRIBUTION

(75) Inventors: Axel G. Huebner, Aachen (DE); Heribert Baldus, Aachen (DE); Oscar Garcia, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1027 days.

(21) Appl. No.: 12/594,610

(22) PCT Filed: Mar. 28, 2008

(86) PCT No.: PCT/IB2008/051168
§ 371 (c)(1),
(2), (4) Date: Oct. 5, 2009

(87) PCT Pub. No.: WO2008/122906
PCT Pub. Date: Oct. 16, 2008

(65) Prior Publication Data
US 2010/0082988 A1    Apr. 1, 2010

Related U.S. Application Data

(60) Provisional application No. 60/910,296, filed on Apr. 5, 2007.

(51) Int. Cl.
*G06F 21/00* (2013.01)
*H04L 9/08* (2006.01)

(52) U.S. Cl.
USPC ............ 380/277; 380/278; 380/279; 713/163

(58) Field of Classification Search
USPC .............. 726/2–10, 17, 20, 21; 713/150, 168, 713/171, 176, 182–186, 189, 192–194; 380/44, 277–279, 281
See application file for complete search history.

(56) References Cited

U.S. PATENT DOCUMENTS 5,812,666 A * 9/1998 Baker et al. .................... 380/277
6,055,314 A * 4/2000 Spies et al. .................... 380/228
(Continued)

FOREIGN PATENT DOCUMENTS

| CN | 1761186 A | 4/2006 |
|---|---|---|
| WO | 0072507 A1 | 11/2000 |
| WO | 02067486 A2 | 8/2002 |
| WO | 2004093405 A1 | 10/2004 |

OTHER PUBLICATIONS

Resource-efficient security for medical body sensor networks. (Morchon OG; Baldus H; Sanchez DS) (Philips Res. Labs.; Aachen; Germany) [BSN 2006. International Workshop on Wearable and Implantable Body Sensor Networks, pp. 4 pp., Published: Los Alamitos, CA, USA, 2006,] CD-ROM pp. (abstract, marked, Philips publication).

(Continued)

*Primary Examiner* — Gilberto Barron, Jr.
*Assistant Examiner* — Abdulhakim Nobahar

(57) ABSTRACT

When installing and maintaining a wireless sensor network in a medical or factory environment, distribution of keying material to sensor nodes (18) is performed by a key material box (KMB) (12), such as a smartcard or the like. The KMB (12) has a random seed stored to it during manufacture, and upon activation performs an authentication protocol with a sensor node (18) to be updated or installed. The KMB (12) receives node identification information, which is used in conjunction with the random seed to generate keying material for the node (18). The KMB (12) then encrypts the keying material for transmission to the node (18), and transmits over a wired or wireless communication link in a secure manner. The node (18) sends an acknowledgement message back the KMB (12), which then updates the nodes status in look-up tables stored in the KMB (12).

15 Claims, 5 Drawing Sheets

(56) References Cited

U.S. PATENT DOCUMENTS

| | | | |
|---|---|---|---|
| 7,024,395 B1 * | 4/2006 | McCown et al. | 705/65 |
| 7,376,234 B1 * | 5/2008 | Gardiner | 380/259 |
| 7,999,685 B2 | 8/2011 | Sanchez et al. | |
| 2005/0102523 A1 * | 5/2005 | Harrison et al. | 713/185 |
| 2005/0172137 A1 * | 8/2005 | Hopkins | 713/185 |
| 2005/0226423 A1 * | 10/2005 | Li et al. | 380/278 |
| 2006/0105748 A1 | 5/2006 | Ooi et al. | |
| 2006/0150241 A1 | 7/2006 | Huh et al. | |
| 2006/0179309 A1 * | 8/2006 | Cross et al. | 713/168 |
| 2007/0041583 A1 | 2/2007 | Boneh et al. | |
| 2007/0248232 A1 * | 10/2007 | Driscoll et al. | 380/280 |
| 2007/0251997 A1 * | 11/2007 | Brown et al. | 235/380 |

OTHER PUBLICATIONS

Healthcare system architecture, economic value, and policy models in large-scale wireless sensor networks. (Song WJ; Moon Kyo Cho; Im Sook Ha; Mun Kee Choi) (Dept. of Comput. Sci.; Virginia Univ.; Charlottesville, VA; USA) [Computer Safety Reliability, and Security. 25th International Conference, SAFECOMP 2006. Proceedings (Lecture Notes in Computer Science vol. 4166), pp. 233-246, Published: Berlin, Germany, 2006, xiv+440 pp.] (abstract, marked).

Menezes, et al.; Handbook of Applied Cryptography; 1997; CRC Press, LLC; p. 3, 24-25, 170, 386-390, 394-395, 493, 546-547, 551-552, 561-562, 578-581.

* cited by examiner

WIRELESS SENSOR NETWORK KEY DISTRIBUTION

CROSS REFERENCE TO RELATED APPLICATIONS

This application claims the benefit of U.S. provisional application Ser. No. 60/910,296 filed Apr. 5, 2007, which is incorporated herein by reference.

The present application finds particular application in managing and distributing key material to sensor nodes in secure networks such as hospital networks or the like. However, it will be appreciated that the described technique(s) may also find application in other types of networks and/or other sensor systems.

Wireless vital sign sensors are increasingly deployed for health monitoring, both at hospital and at home. Security and privacy are important considerations for wireless systems, especially in the medical domain Easy, secure, and reliable distribution and management of security keying material for sensor nodes and within clinical organizations are also important for proper security deployment.

For conventional wireless sensor networks (WSNs), key management is of paramount importance since it enables further security services such as, e.g., confidentiality, authentication and integrity. In general, key management involves creation, distribution, and update of keying material for wireless sensor nodes. In the relevant standards, such as, for instance, IEEE 802.15.4, security is only partly covered.

In this case, basic security services are specified by the advanced encryption standard (AES), but key management is completely missing. Accordingly, additional procedures are needed to enable key management in WSNs. More specifically, keying material must be distributed to the WSN nodes.

Key pre-distribution schemes (KPSs) are a specific type of key management solution, based on the pre-distribution of keying material to WSN nodes before deployment. After deployment, WSN nodes can exploit their correlated keying material to agree on a common pairwise key and setup a secure communication. KPSs assume that keying material is provided to the WSN nodes prior to deployment in a secure environment. However, there are circumstances where this assumption is not available, such as when the keying material needs to be provided to the WSN node either in a hostile environment, or after deployment. In medical WSNs, such cases can occur when WSN nodes are used for the first time. Before deployment, WSN nodes received default keying material. All nodes carrying this default keying material belong to a single large security domain in which all nodes are securely interoperable. However, customers might want to create their own security domains after deployment, so that only their sensors or sub-sets of their sensors have correlated keying material. In this manner, customer can establish their security domains and manage to which security domains their sensor belongs. Additionally, this can occur when WSN nodes are replaced or exchanged between different hospital departments, or security domains, such that the keying material must be updated in order to enable interoperability (e.g., even when interoperability is guaranteed between different security domains of a hospital, such as when a hierarchical KPS is used, the keying material must be updated to enhance the level of security). Still other examples include the case where keying material is compromised, such as by an intruder who is able to eavesdrop on the communication of one or several WSN nodes, as well as when keying material is proactively changed according to a predetermined schedule in order to enhance security and to prevent from undetected compromised keying material. Thus, there is an unmet need in the art for systems and methods that facilitate providing keying material to WSN nodes not only before deployment in a secure environment, but after deployment as well.

In accordance with one aspect, a system for secure distribution of KPS keying material to WSN nodes based on a Key Management Box (KMB) is disclosed. A KMB generates and distributes KPS keying material to WSN nodes on demand. Keying material generation occurs after identification and authentication of the target WSN node. Keying material distribution is carried out in a secure manner between KMB and WSN nodes.

In accordance with another aspect, a method to arrange WSN nodes in security domains (SD) based on a KMB is disclosed. Based on different features of Hospital WSNs as well as the KPS used, the KMB generates and distributes keying material to WSN nodes, so that only WSN nodes carrying correlated keying material from a flat or a hierarchical KPS belong to the same SD, and thus, can setup a secure communication.

One advantage is that keying material is generated on demand immediately prior to providing the material to a WSN node.

Another advantage is that both the information used to generate the keying material and the generated keying material remains secure in the KMB.

Another advantage resides in the secure transmission (Confidentiality, Authentication and Integrity) of the keying material to the WSN nodes.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

Figure 1:
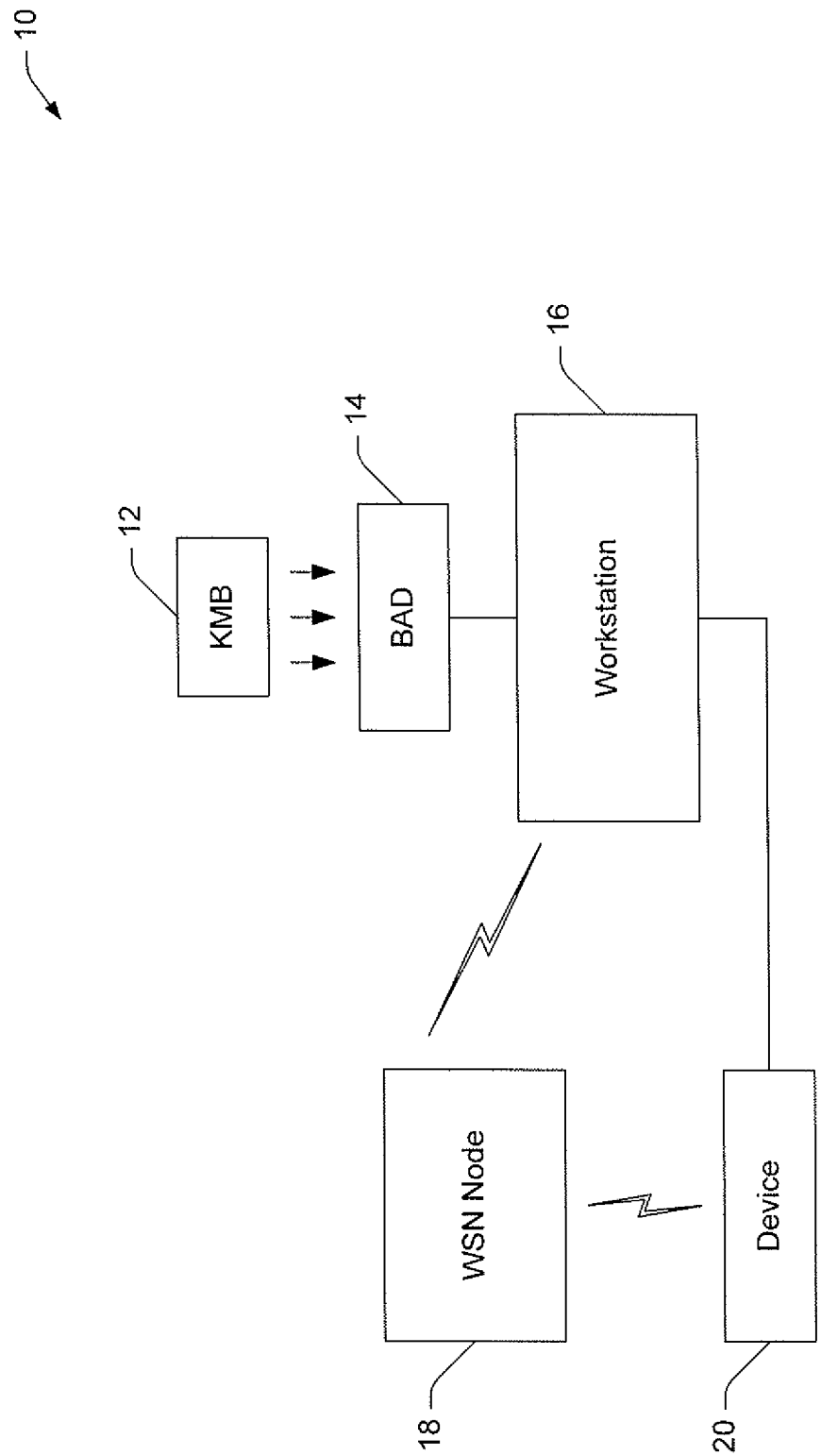
FIG. 1 illustrates a system for managing and distributing key material to healthcare WSN nodes in a secure way based on a KMB.

FIG. 1 illustrates a system 10 for managing and distributing key material to healthcare WSN nodes in a secure manner using a KMB. The system can thus be employed in medical systems utilizing medical WSNs for patient monitoring or personal health care. In other embodiments, the system can be utilized in lighting systems, such as WSN lighting control systems for complete buildings, plants, etc. According to one or more embodiments, the system facilitates distributing, maintaining, and updating keying material for sensor nodes without requiring knowledge of intricacies associated with a security platform employed to ensure secure communication between sensors and other system components in a wireless sensor network. For instance, in a hierarchical KPS based on polynomials, sensor nodes are able to establish pairwise keys in a very efficient manner by exploiting pre-distributed polynomials. The KMB is employed in this embodiment to generate and distribute the polynomials to WSN nodes in a secure manner. The polynomials are generated on the fly by using a random seed and afterwards transmitted to WSN nodes in a secure manner.

Sensor nodes and the KMB, which can be implemented as a smartcard used in conjunction with a workstation, can be pre-encoded with a secret key. Alternatively, the KMB can generate a secret key for use with a sensor when the sensor is first configured by the customer. The sensor and the KMB then utilize the secret key to authenticate each other whenever the KMB provides keying material to the sensor. Once authenticated, the sensor node transmits its ID to the KMB, which then calculates keying material for the sensor. The calculated keying material is then encrypted with the secret key or a secret generated from that secret key by using a hash function or similar. Keying material is then transmitted to the sensor, which in turn acknowledges receipt of the keying material. Sensor nodes can then employ the keying material to establish pairwise keys with other sensor nodes.

The system comprises a key (or keying) management box (KMB) 12 that is inserted into a box-acceptance device (BAD) 14 (also called a box reader or box terminal). The BAD is operatively coupled to a customer tool, such as a workstation 16. The BAD is integral to the workstation in some embodiments, and external to the workstation (e.g., coupled by a cable or wireless link) according to others. The KMB can be, for instance, a smartcard or similar memory device, in which case the BAD is a smartcard docking receptacle or the like. According to other embodiments, the KMB is a memory stick, a CD, a floppy disk, or other suitable storage medium, and the BAD is a device of a type capable of receiving the respective corresponding KMB type.

A wireless sensor network (WSN) node 18 is connected to a device 20, such as a battery loader, a monitor, or another WSN node, which in turn is connected to the customer tool (possibly via additional peripherals, not shown), the workstation 16 additionally includes protocols for communication between the various system components. According to other embodiments, the WSN node 18 and the device 20 can communicate wirelessly. In some aspects, the WSN node is a wireless vital sign sensor or the like. Wireless vital sign sensors are increasingly deployed for health monitoring, both at hospitals and at remote locations, such as patient's homes. Because security and privacy are crucial for wireless systems, especially in the medical domain, easy, secure, and reliable distribution and management of security material for sensor nodes within clinical organizations are important aspects of proper security deployment. According to some examples, the WSN node is a wireless sensor for measuring a status of a patient, such as pulse rate, $SpO_2$, respiration rate, ECG-related information, temperature, motion or movement, or any other suitable measurable aspect of the patient.

Sensor node 18 and the KMB 12 can be factory-preconfigured with keying material. In other embodiments, the KMB generates keys for respective sensor nodes during system configuration and/or installation generating custom keying material. The generated keying material is then subsequently transmitted to sensor nodes in a secure way. Additionally, sensor nodes have a unique ID that facilitates executing authentication protocols to further bolster system security. In some embodiments, all sensor nodes in a security domain or other defined region use correlated keying material, and have the same key codec for communication (e.g., encryption and decryption protocols are built into the node during manufacture). When updating key material, sensor nodes communicate with the KMB to obtain the keying material. Different sensors receive correlated, but not necessarily identical, keying material. In an embodiment, any pair of WSN nodes can exploit pre-distributed keying material to generate pair-wise keys. In general, any pair of WSN nodes use pre-distributed keying material to setup a secure communication.

System 10 is designed to securely manage cryptographic keying material of medical wireless sensor networks using the KMB, which provides features such as personal identification number (PIN) protected memory area and end-to-end encryption. Additionally, the system facilitates securely managing keying material of WSN nodes after delivery and/or deployment throughout an environment in which the nodes are utilized such as a hospital. Keying material can be easily updated or changed without requiring a biomedical engineer or nurse to have detailed knowledge of the underlying security mechanisms. Security domains to which WSN nodes belong can also be established, maintained, and changed after delivery, which is a shortcoming of conventional systems.

A security domain in a KPS-based system is composed of all the sensor nodes carrying correlated KPS keying material. The KMB distributes this correlated keying material to nodes to enable them to establish a secure communication, for example, by exploiting the keying material. Examples of security domains include a hospital security domain (e.g., wherein all nodes are able to communicate with each other), a department security domain (e.g., only nodes in a given department may communicate with one another), a floor security domain, a distributed corporation security domain, etc.

In accordance with some embodiments, keying material is generated on demand, substantially instantaneously before supplying the keying material to a corresponding WSN node. Parameter(s) that are stored to generate unique keying material (e.g., random seed or the like) are protected and require authentication to be accessed, such as in a PIN protected memory of the KMB. After generation, the keying material is immediately encrypted using a cryptographic key that is common to the corresponding WSN node and the KMB, and only to those two devices. Operations are executed on a single device (e.g., the KMB) so that the keying material does not leave the KMB without being encrypted. Additionally, operations can be provided with user-specific PIN protection, and different levels of authorization can be established so that one KMB can supply different security domains (e.g., wards in a hospital, areas of an office, warehouse, factory, etc.) Moreover, a single parameter is sufficient to build an entire security domain. That is, a security service provider can store a single number to replicate a customer's security domain in case of a loss or damage to the KMB. In some embodiments, a single parameter is sufficient to generate a hierarchical infrastructure of security domains, as different security domain seeds can be generated from the single parameter by means of, e.g., a hash function. Operations and generation of keying material for some security domains can be restricted by means of a PIN, password or similar.

Figure 2:
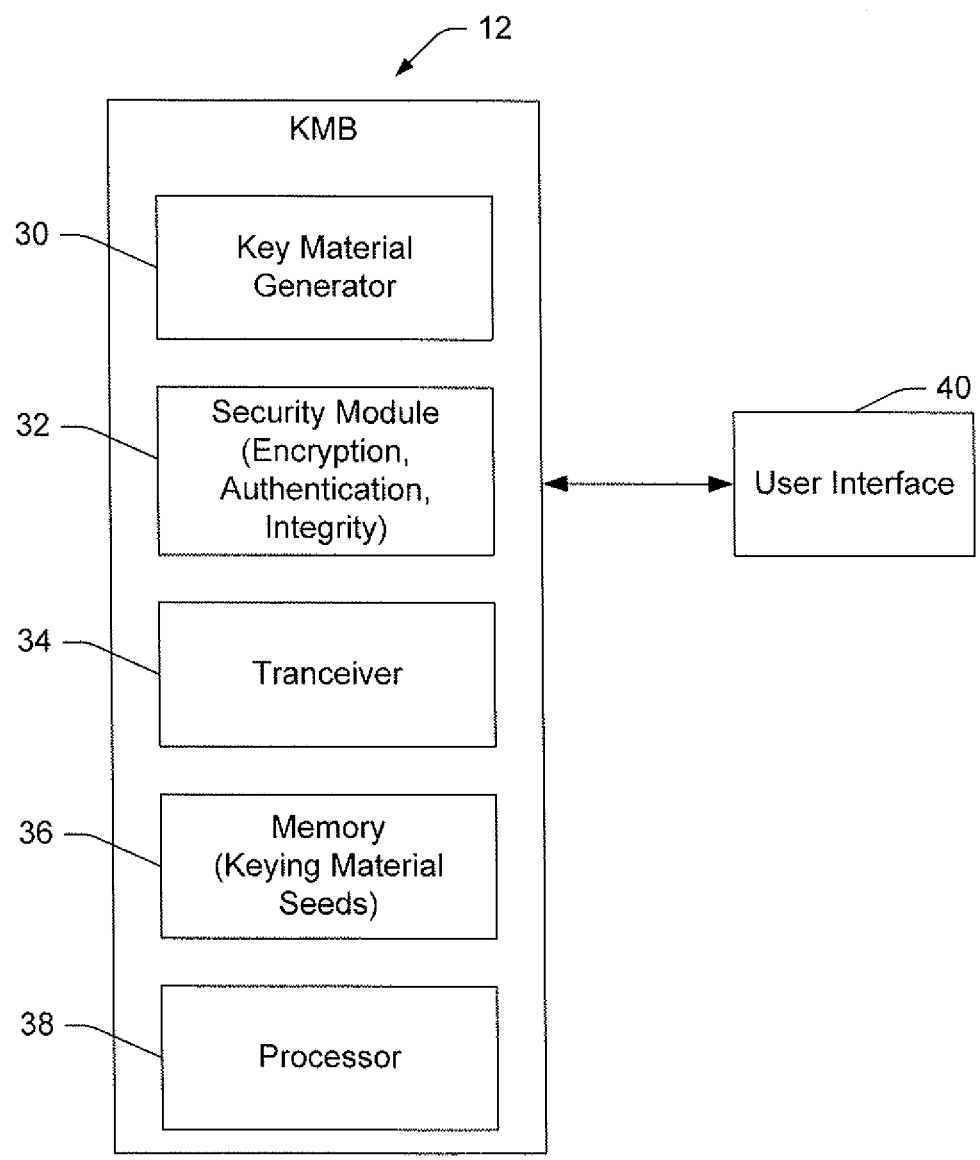
FIG. 2 is an illustration of the KMB and associated components that facilitate distributing key material to sensor nodes in healthcare WSNs.

FIG. 2 is an illustration of the KMB 12 and associated components that facilitate distributing key material to sensor nodes in healthcare WSNs. The KMB 12 includes a key material generator 30 that generates keying material for one or more sensor nodes on demand, using a key generation algorithm. For instance, keying material is first generated for a specific sensor node on the KMB, and a security module 32 then encrypts the keying material using a common key of a respective sensor node and the KMB itself. The security module additionally provides authentication and integrity. A transceiver 34 transmits the keying material from the KMB to the sensor node via a wired or wireless link. Therefore, keying material leaves the KMB in an encrypted version and cannot be compromised by simply eavesdropping the link without knowledge of the cryptographic key used to encrypt the keying material. Additionally, sensitive data is stored in a memory 36 of the KMB memory and user authentication is required for each operation to be executed on the KMB. According to an embodiment, the memory 36 is PIN-protected. A user interface 40 permits a user to interact with the KMB, in order to facilitate entering information such as a PIN, authentication information, identification information, or any other suitable information associated with performing the various actions described herein.

The KMB additionally includes a processor 38 that executes computer-executable instructions for carrying out protocols related to the various functions described herein, (e.g., keying material generation, encryption and/or decryption, transmission, etc.). It will be appreciated that the processor can be a processor dedicated to analyzing information received by the KMB, generating information transmitted by the KMB, and/or executing instructions associated with KMB function.

According to another embodiment, the KMB is a smartcard with cryptographic co-processor that supports asymmetric cryptography methods, also known as public key methods. A new random seed, which corresponds to an update of the keying material on the smartcard, can be securely transmitted to the card from a server of a security service provider, using the Internet and the respective hospital infrastructure.

Figure 3:
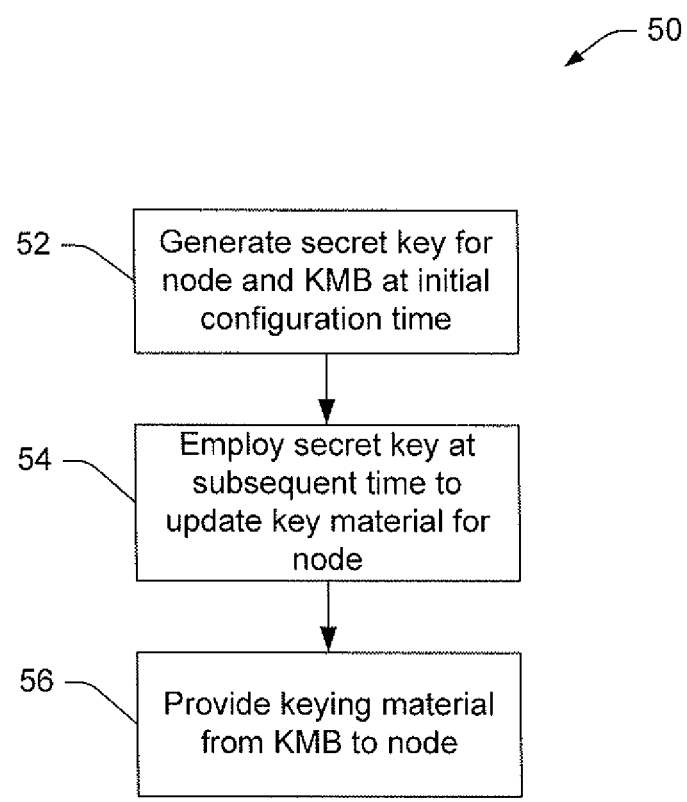
FIG. 3 is an illustration of a method of updating keying material for a sensor node in a WSN using a KMB.
Figure 4:
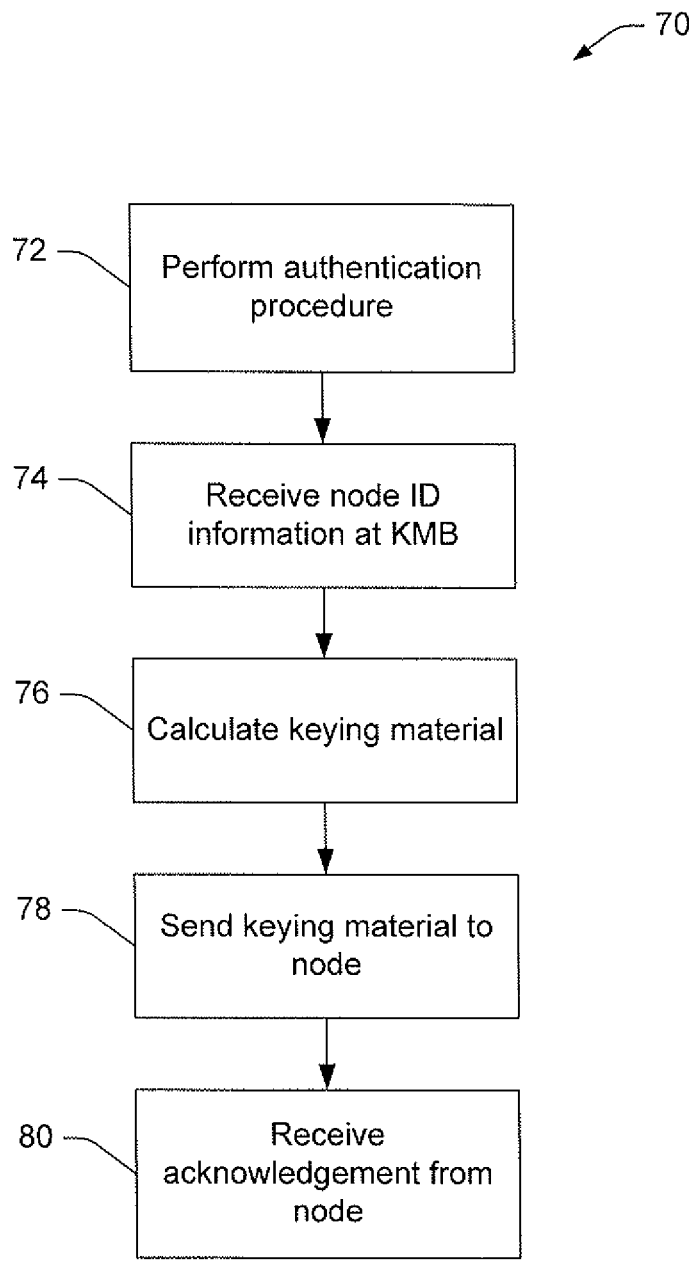
FIG. 4 illustrates a method of distributing or updating keying material to a sensor node from a KMB after installation and/or configuration of the sensor node in a WSN.
Figure 5:
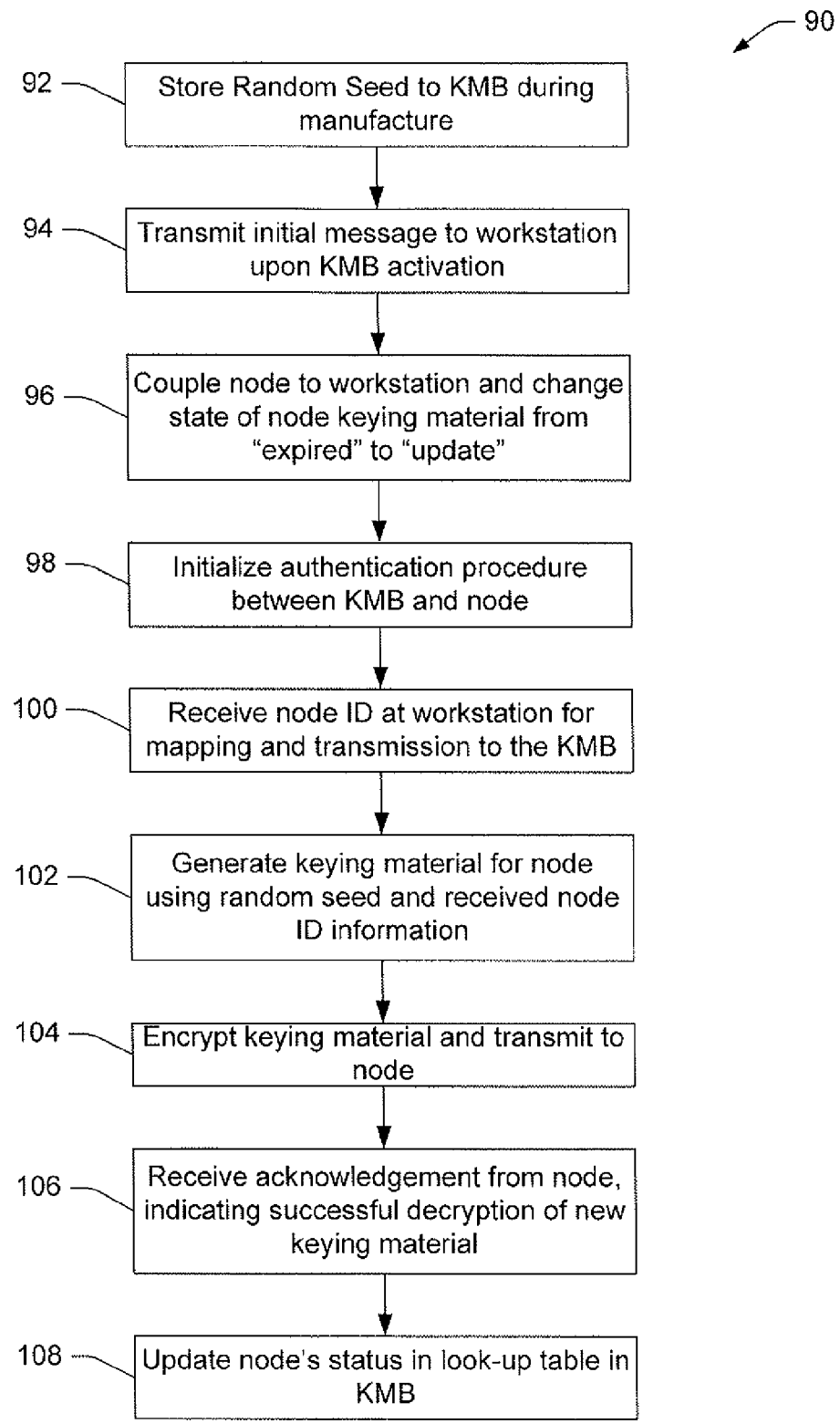
FIG. 5 illustrates a method of generating and distributing keying material for sensor nodes in a WSN, in accordance with one or more aspects described herein.

FIGS. 3-5 illustrate one or more methods related to distributing, maintaining, and/or updating keying material for sensor nodes in a wireless sensor network, in accordance with various features. While the methods are described as a series of acts, it will be appreciated that not all acts may be required to achieve the described goals and/or outcomes, and that some acts may, in accordance with certain aspects, be performed in an order different than the specific orders described.

FIG. 3 is an illustration of a method 50 of updating keying material for a sensor node in a WSN using a KMB. At 52, a secret key is generated, which permits the KMB and sensor node to authenticate each other. The secret key is generated when the sensor node is first configured. Alternatively, the KMB and sensor node can be pre-configured with the secret key during manufacture. At 54, the secret key is employed by the KMB and sensor node to authenticate each other to permit the KMB to generate and transmit keying material updates for the sensor node.

At 56, keying material is provided from the KMB to the node. Providing the keying material can be performed by connecting the node to a workstation or peripheral component attached to the workstation, which is also coupled to the KMB. In this sense, key material can be provided to the node using a wired connection. According to another embodiment, the node communicates wirelessly with the workstation, which transfers keying material provided by the KMB to the node using a wireless communication protocol, such as Bluetooth, Zigbee, or the like.

FIG. 4 illustrates a method 70 of distributing and/or updating keying material to a sensor node from a KMB after installation and/or configuration of the sensor node in a WSN. At 72, an authentication procedure is performed between the sensor node and the KMB, such as by verifying a secret key common to the sensor and the KMB, where the secret key is pre-encoded to the sensor and KMB during manufacture, generated by the KMB during initial setup, etc. At 74, the KMB receives node identification information (e.g., a node ID or the like) that permits the KMB to identify the node and evaluate information associated with the node via a table lookup of information stored in a PIN-protected memory of the KMB. At 76, the KMB calculates keying material for the node, based in part on the node's ID, status of existing keying material at the node (e.g., expired, current or up-to-date, etc.), keying material seed stored in the KMB, etc. The KMB transmits the new keying material to the node at 78. The node then transmits an acknowledgement of receipt of the new keying material, at 80. The new keying material is employed by the node to generate pairwise keys with other device to which it is coupled, between multiple nodes, between the node and the workstation, etc. Those pairwise keys are used afterwards to provide further security services.

FIG. 5 illustrates a method 90 of generating and distributing keying material for sensor nodes in a WSN, in accordance with one or more aspects described herein. At 92, random seed information is stored to memory in a KMB during manufacture, which permits the KMB to initiate a cryptographically secure random generator. For instance, during the manufacturing process, a parameter is stored in a PIN-protected memory area in the KMB. The parameter, namely a random seed for the initialization of the cryptographically secure random generator, is also stored in the security service provider's vault for KMB replication purposes. At 94, upon activation of the KMB, such as by employing a security domain-specific user authentication protocol at the customer tool or workstation, the KMB sends a message to the workstation. At this point, the keying material of all WSN nodes is marked as "expired." For instance, the KMB contains a lookup table containing WSN node IDs and a tag for each node indicating that the keying material of a given WSN node is either "expired" or "up-to-date." When a WSN node, whose keying material is expired, is brought to a device (e.g., a battery loader, a patient monitor, etc.) connected to the workstation, it is placed into a "keying material update" state, at 96. At 98, an authentication procedure between the WSN node and the KMB is initialized to verify that both the WSN node and the KMB are legitimate, and the KMB requests another security domain-specific user authentication in order to provide key management functionalities.

Upon successful authentication between the WSN node and the KMB, the WSN node transmits its ID to the workstation, which maps the node ID to keying material IDs for the nodes, which are then transmitted to the KMB, at 100. On the KMB, corresponding keying material for an identified WSN node is generated using the secret random seed, at 102. For instance, the random seed, together with the received ID information, is used to calculate and evaluate keying material (e.g., bivariate polynomials and their evaluated versions in the case of a key pre-distribution scheme, or the like). The keying material is then encrypted, at 104, using the common cryptographic key and transmitted to the WSN node. Transmission of the encrypted keying material can be performed over a wireless connection between the node and KMB or between the node and the workstation. The WSN node decrypts its new keying material and sends an acknowledgement to the workstation indicating successful decryption of the keying material message, at 106. At 108, the KMB marks the node as "updated" in its look-up table.

According to an example, when a KMB is manufactured, a random seed is stored to a PIN-protected memory therein. Initially, when the KMB is activated (e.g., in a hospital or the like) in order to set up a WSN, all nodes are marked as "expired," such that they are indicated as not having current keying material. An expired node is then brought to the KMB and/or the customer tool or workstation associated with the KMB, and its status is changed to "updating" or the like, to indicate that the node is being updated. An authentication procedure is then performed between the KMB and the node, which may involve user entry of a PIN (e.g., the user enters a PIN into the workstation). Once authenticated, the node provides its ID to the KMB, and the ID is mapped to keying material IDs. Additionally, a common private key is established between the node and the KMB to facilitate communication there between. The KMB then generates keying material for the node using the stored random seed in conjunction with the keying material IDs. The keying material is then encrypted using common private key and transmitted to the node, which in turn decrypts the keying material. The node is then marked as "updated" or the like, and the user moves on to a next node for updating, until all nodes in a ward of the hospital are updated. Up-to-date sensor nodes can then be employed to monitor one or more vital signs of a patient, and can employ the updated key material to encrypt the vital sign information for transmission over the WSN.

In this manner, the KMB and node can utilize a handshake authentication protocol to verify each other's legitimacy, and the KMB can generate and transmit updated keying material to the node in order to permit the node to continue communicating in the WSN in which it is employed. For instance, the WSN may be employed in a medical environment, such as a hospital, a specific ward therein, or some other healthcare environment. According to other examples, the WSN is employed in warehouse or manufacturing facility. The KMB thus provides secure communication of keying material updates using end-to-end encryption protocols. Keying material is generated and evaluated for a specific node in the WSN, and encrypted using a common key that is known to the sensor node and the KMB. The keying material is then transmitted from the KMB using a wired or wireless link. Moreover, sensitive data is stored in the PIN-protected memory of the KMB, permitting a user to authorize each operation executed on the KMB by entering a specific PIN.

Having thus described the preferred embodiments, the invention is now claimed to be:

1. A system for distributing keying material to nodes in a wireless sensor network (WSN), including:
   a key management box (KMB) that stores keying material for at least one sensor node in the WSN; and
   a security module, in the KMB, that encrypts keying material for transmission to the at least one sensor node;
   wherein the KMB transmits the encrypted keying material to the at least one sensor node and receives an acknowledgment of receipt of the keying material from the sensor node;
   wherein upon activation of the KMB, a status of the at least one sensor node is indicated to be expired in a look-up table stored in the KMB; and
   wherein upon receipt of the acknowledgment at the KMB, the lookup table is updated so that the status of the at least one sensor node is indicated to be current.

2. The system according to claim 1, wherein the KMB is a smartcard.

3. The system according to claim 1, wherein the KMB generates keying material for the at least one sensor node when the at least one sensor node is added to the WSN.

4. The system according to claim 1, wherein the KMB stores status information that describes a state of the keying material of the at least one sensor node.

5. The system according to claim 1, wherein the KMB and the at least one sensor node execute an authentication procedure using a secret key when the at least one sensor node needs a keying material update.

6. The system according to claim 5, wherein the KMB generates new keying material for the at least one sensor node upon successful authentication of the at least one sensor node.

7. The system according to claim 6, wherein the security module encrypts the new keying material, and the KMB transmits the encrypted keying material to the at least one sensor node.

8. The system according to claim 1, wherein the KMB further includes a PIN-protected memory that stores at least one of secret key information, keying material, and status information, associated with the at least one sensor node.

9. The system according to claim 1, wherein the KMB includes:
   a routine for executing an authentication procedure between the KMB and the at least one sensor node;
   a routine for receiving node ID information from the at least one sensor node;
   a routine for calculating new keying material for the at least one sensor node;
   a routine for sending the new keying material to the at least one sensor node; and
   a routine for receiving an acknowledgement of receipt of the new keying material from the at least one sensor node.

10. The system according to claim 1, wherein the KMB and the at least one sensor node are configured to authenticate each other using a secret key during manufacture or during initial installation.

11. The system according to claim 1, wherein the KMB includes a random seed that is stored to the KMB during manufacture or activation.

12. The system according to claim 11, wherein the KMB and the at least one node are coupled to a workstation and execute an authentication procedure.

13. The system according to claim 12, wherein the KMB employs the random seed and node ID information to generate the keying material.

14. The system according to claim 13, wherein a status of the at least one sensor node is updated in a look-up table stored in the KMB after receipt at the KMB of an acknowledgement that the at least one sensor node has received the keying material.

15. The system according to claim 1, wherein the KMB receives an acknowledgement from the at least one sensor node indicating that the keying material has been received.

* * * * *